(12) United States Patent
Elsayed et al.

(10) Patent No.: US 8,005,173 B2
(45) Date of Patent: Aug. 23, 2011

(54) COARSE FREQUENCY OFFSET ESTIMATION FOR DIGITAL MULTIMEDIA BROADCASTING

(75) Inventors: Elsayed Ahmed Elsayed, Cairo (EG); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 698 days.

(21) Appl. No.: 12/124,389

(22) Filed: May 21, 2008

(65) Prior Publication Data
US 2009/0290663 A1  Nov. 26, 2009

(51) Int. Cl.
*H03D 1/00* (2006.01)
*H04L 7/00* (2006.01)
(52) U.S. Cl. ........................................ 375/343; 375/354
(58) Field of Classification Search .................. 375/259, 375/258, 316, 340, 343, 346, 354, 362
See application file for complete search history.

(56) References Cited

U.S. PATENT DOCUMENTS

| 2004/0190438 A1* | 9/2004 | Maltsev et al. | 370/206 |
| 2005/0078649 A1* | 4/2005 | Tehrani et al. | 370/343 |
| 2008/0095249 A1* | 4/2008 | Yoon et al. | 375/260 |

* cited by examiner

*Primary Examiner* — Dac Ha
*Assistant Examiner* — Vineeta Panwalkar
(74) *Attorney, Agent, or Firm* — Rahman LLC (57) ABSTRACT

A method of estimating a coarse frequency offset of Digital Multimedia Broadcasting (DMB) transmission frames includes receiving the DMB transmission frames including a synchronization channel having a phase reference symbol, circularly shifting the phase reference symbol by applying a circular shift to the phase reference symbol, numerically correlating the circularly shifted phase reference symbol with a known correct phase reference symbol to obtain a highest peak and a side peaks of the numeric correlation, and computing a phase reference symbol angle based on a multiplication of the peak and a carrier spacing of the DMB transmission frames. The peak is determined when the circularly shifted phase reference symbol is equal to the known correct phase reference symbol. The peak and side peaks corresponding to the peak are operated in a range of a maximum value of the circular shift.

20 Claims, 10 Drawing Sheets

| PEAK 602 | FREQUENCY OFFSET 604 | COUNTER 606 | CHANGE FLAG STATUS 608 |
|---|---|---|---|
| 1ST PEAK | CORRESPONDING FREQUENCY OFFSET | COUNTER | CHANGE FLAG |
| 2ND PEAK | CORRESPONDING FREQUENCY OFFSET | COUNTER | CHANGE FLAG |
| 3RD PEAK | CORRESPONDING FREQUENCY OFFSET | COUNTER | CHANGE FLAG |

FIG. 6A

| PEAK 602 | FREQUENCY OFFSET 604 |
|---|---|
| 1ST PEAK | CORRESPONDING FREQUENCY OFFSET |
| 2ND PEAK | CORRESPONDING FREQUENCY OFFSET |
| 3RD PEAK | CORRESPONDING FREQUENCY OFFSET |

COARSE FREQUENCY OFFSET ESTIMATION FOR DIGITAL MULTIMEDIA BROADCASTING

BACKGROUND

1. Technical Field

The embodiments herein generally relate to Digital Multimedia Broadcasting (DMB), and more particularly to coarse frequency offset estimation for DMB.

2. Description of the Related Art

DMB is a digital radio transmission system for sending multimedia (radio, TV, and data casting) to receivers such as mobile phones. In a receiver, imperfection in a crystal oscillator produces a frequency offset, which results in incorrect or incomplete reception. Frequency offsets are typically caused by mismatched transmitter and receiver oscillators. The effect of the frequency offset is a circular shift in the frequency domain. The phase reference symbol has the largest peak and corresponding side peaks. The largest peak has a presence of fading (e.g., distortion in a carrier-modulated signal) and noise which results in incorrect estimation.

SUMMARY

In view of the foregoing, an embodiment herein provides a method of estimating a coarse frequency offset of DMB transmission frames. The method includes receiving the DMB transmission frames including a synchronization channel having a phase reference symbol, circularly shifting the phase reference symbol by applying a circular shift to the phase reference symbol, numerically correlating the circularly shifted phase reference symbol with a known correct phase reference symbol to obtain a highest peak and a side peaks of the numeric correlation, and computing a phase reference symbol angle based on a multiplication of the peak and a carrier spacing of the DMB transmission frames.

Preferably, the peak is determined when the circularly shifted phase reference symbol is equal to the known correct phase reference symbol. The peak and side peaks corresponding to the peak are preferably operated in a range of a maximum value of the circular shift. A negative value of the peak and the side peaks may be discarded when performing the correlating process. The peak may be stored in a buffer.

Another embodiment provides a method of estimating a coarse frequency offset in DMB transmission frames includes receiving the DMB transmission frames including a synchronization channel having a phase reference symbol, circularly shifting the phase reference symbol by applying a circular shift to the phase reference symbol, numerically correlating the circularly shifted phase reference symbol with a known correct phase reference symbol to obtain a highest peak and a side peaks of the numeric correlation, and computing a phase reference symbol angle based on a multiplication of the peak and a carrier spacing of the DMB transmission frames, summing the phase reference symbol angle for all of sub carriers within the phase reference symbol, computing an average of the highest peak over the DMB transmission frames to reduce effects of the side peaks, and estimating a coarse frequency offset of the DMB transmission frames based on the computing process.

The peak is preferably determined when the circularly shifted phase reference symbol is equal to the correct phase reference symbol. The computing process is preferably performed based on $X=a*X$ (in buffer)$+(1-a)*X$ (new), where a represents leaky integrator alpha. Preferably, the peak and side peaks corresponding to the peak are operated in a range of a maximum value of the circular shift. A negative value of the peak and the side peaks may be discarded when performing the correlating process. Preferably, the peak is stored in a buffer.

Another embodiment provides an apparatus for estimating a coarse frequency offset in DMB transmission frames is provided. The apparatus includes a receiver that receives a phase reference symbol, a memory unit operatively connected to the receiver and including a programmable set of instructions, a display unit operatively connected to the memory unit, a buffer operatively connected to the memory unit, the buffer including data fields for a peak of a correlator output, a frequency offset of the DMB frames, a counter, and a change flag, and a processor that processes the programmable set of instructions including receiving the DMB transmission frames including a synchronization channel having a phase reference symbol, circularly shifting the phase reference symbol by applying a circular shift to the phase reference symbol, numerically correlating the circularly shifted phase reference symbol with a known correct phase reference symbol to obtain a highest peak and a side peaks of the numeric correlation, computing a phase reference symbol angle based on a multiplication of the peak and a carrier spacing of the DMB transmission frames, summing the phase reference symbol angle for all of sub carriers within the phase reference symbol, computing an average of said highest peak over the DMB transmission frames to reduce effects of the side peaks if a frequency offset exists in the buffer, updating the change flag, incrementing the counter, and determining a buffer entry if the buffer entry with the counter is greater than or equal to a predefined parameter.

The peak is obtained when the shifted phase reference symbol is equal to the correct phase reference symbol. The peak average is performed based on $X=a*X$ (in buffer)$+(1-a)*X$ (new), where a represents leaky integrator alpha. A lowest peak is selected and replaced in the buffer if the frequency offset does not exist in the buffer. The change flag is periodically updated and said counter is set to 1. The buffer entry is stored in a decision buffer if the buffer entry is greater than or equal to the predefined parameter. The decision buffer includes the peak and the frequency offset. The peak in the decision buffer is selected and a corresponding frequency offset is returned as the coarse frequency offset. All unchanged buffer entries are decayed in the buffer and the decision buffer. The buffer entry is determined if the peak terminates.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of estimating a coarse frequency offset of DMB transmission frames. Referring now to the drawings, and more particularly to FIGS. 1 through 10, where similar reference characters denote corresponding features consistently throughout the figures, there are shown preferred embodiments.

Figure 1:
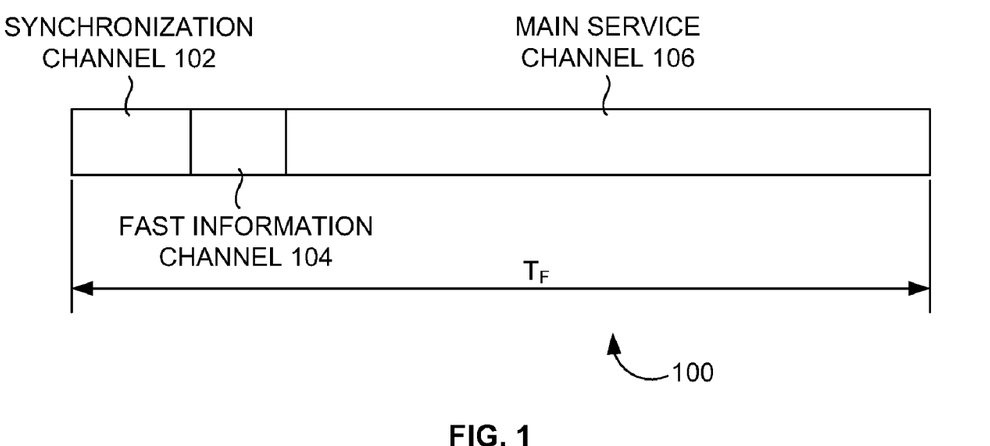
FIG. 1 illustrates a DMB transmission frame structure used in accordance with the embodiments herein.

FIG. 1 illustrates a DMB transmission frame ($T_F$) structure 100 having a synchronization channel 102, a Fast Information Channel (FIC) 104, and a Main Service Channel (MSC) 106. The synchronization channel 102 includes the first two symbols of each transmission frame 100. The two symbols are a null symbol and a phase reference symbol. The first Orthogonal Frequency Division Multiplexing (OFDM) symbol of the transmission frame 100 is the null symbol of signal 0. The null symbols are used to allow a limited number of OFDM carriers to convey Transmitter Identification Information (TII), which is used for determining the geographical locations and the time delay between the transmitters (not shown).

The second OFDM symbol of the transmission frame 100 is the phase reference symbol. The phase reference symbol constitutes the reference for the differential modulation for the next OFDM symbol. The synchronization channel 102 may also be used for carrying an optional TII). The FIC 104 is used for rapid access of information by a receiver (such as receiver 800 of FIG. 8). In one embodiment, the FIC 104 is used to send the Multiplex Configuration Information (MCI) and optionally service information (SI) and data services. MCI carries information about the system organization, SI carries control information for each data service, and data services are the data (video, audio, etc.) itself. The MSC 106 is used to carry audio and data service components. The MSC 106 is a data channel divided into a number of sub-channels which are individually convolutionally coded. Each sub-channel may carry one or more service components.

Figure 2:
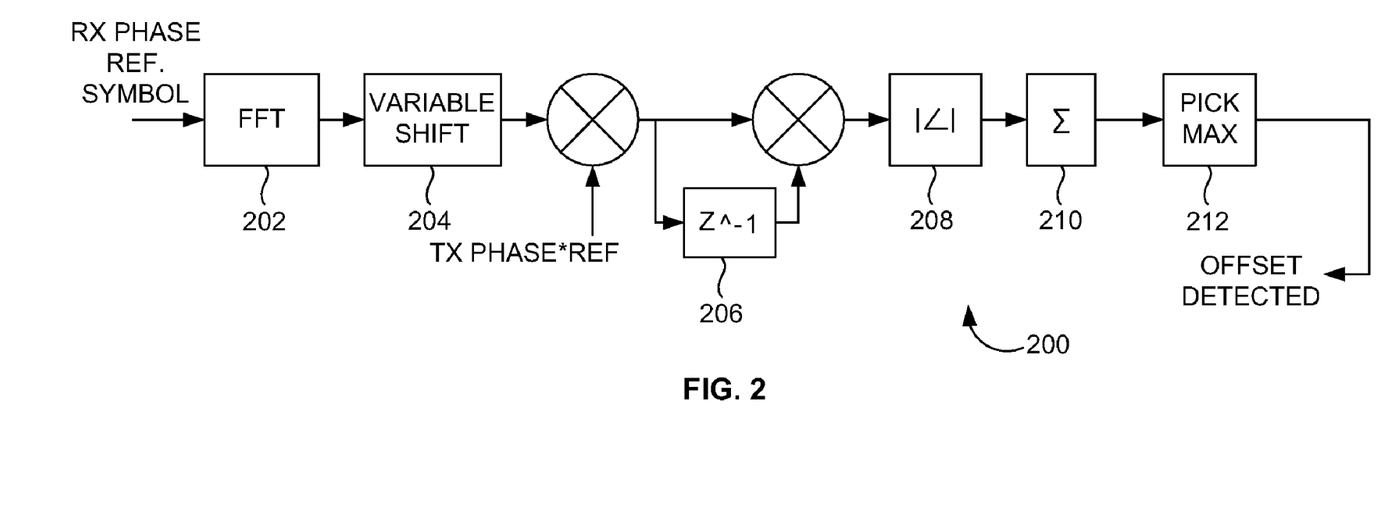
FIG. 2 illustrates a block diagram of a correlator according to an embodiment herein.

FIG. 2 illustrates a block diagram of a correlator 200 having an FFT block 202, a variable shift block 204, a delay element block 206, an angle computation block 208, a summation block 210, and a pick max offset block 212 according to an embodiment herein. A receiver phase reference symbol is fed as an input to the FFT block 202. The FFT block 202 converts the received phase reference symbol to a frequency domain. The variable shift block 204 circularly shifts the symbol and divides it by the correct phase reference symbol. In one embodiment, a transmitter phase reference symbol is mixed with the symbol from the variable shift block 204. In FIG. 2, the $Z^{-1}$ delay element block 206 represents a one sub-carrier delay. The two consecutive symbols are multiplied and the angle is computed by the angle computation block 208. The summation block 210 sums up for all the sub-carriers within a symbol. The pick max block 212 provides the required frequency offset (shift value) corresponding to the maximum sum as output.

Figure 3:
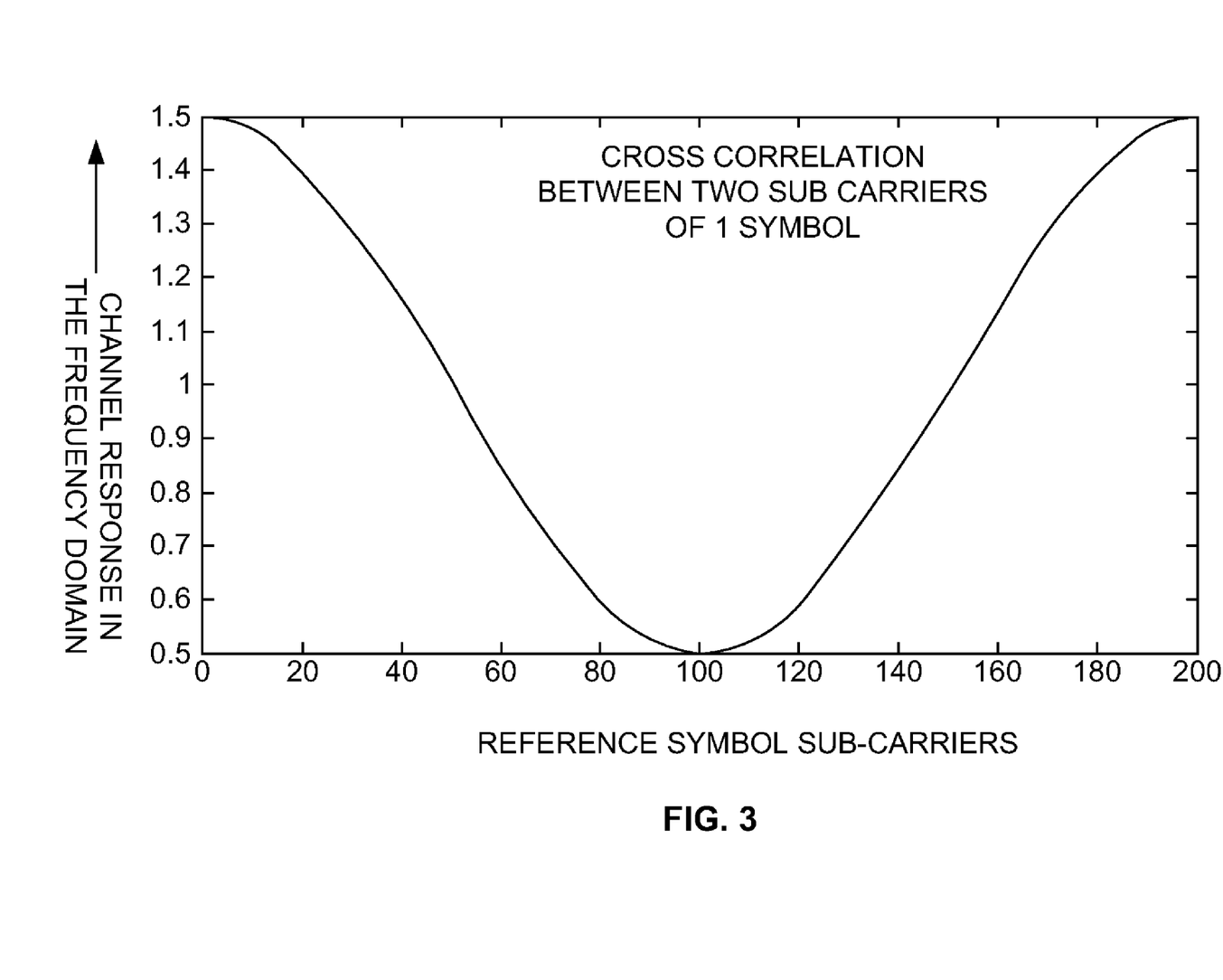
FIG. 3 illustrates a graphical representation of the channel impulse response along the phase reference symbol sub carriers according to an embodiment herein.

FIG. 3 illustrates a graphical representation of the channel impulse response along the phase reference symbol sub carriers according to an embodiment herein. The graphical representation is a plot of a channel response in the frequency domain along y-axis and phase reference symbol sub carriers along x-axis. In order to estimate the frequency offset each two consecutive symbols are multiplied and the angle is computed and summed up for all sub carriers within a symbol. The angle of each sub carrier within a symbol is affected by two factors: (1) the frequency offset in the received symbol; and (2) the channel fading (response shown in FIG. 3). As shown in FIG. 3, the channel fading is varying smoothly such that the only factor affecting each sub carrier angle is the frequency offset. Thus the angle of each sub-carrier would be an indication to frequency offset and fading due to channel may be neglected.

Figure 4A:
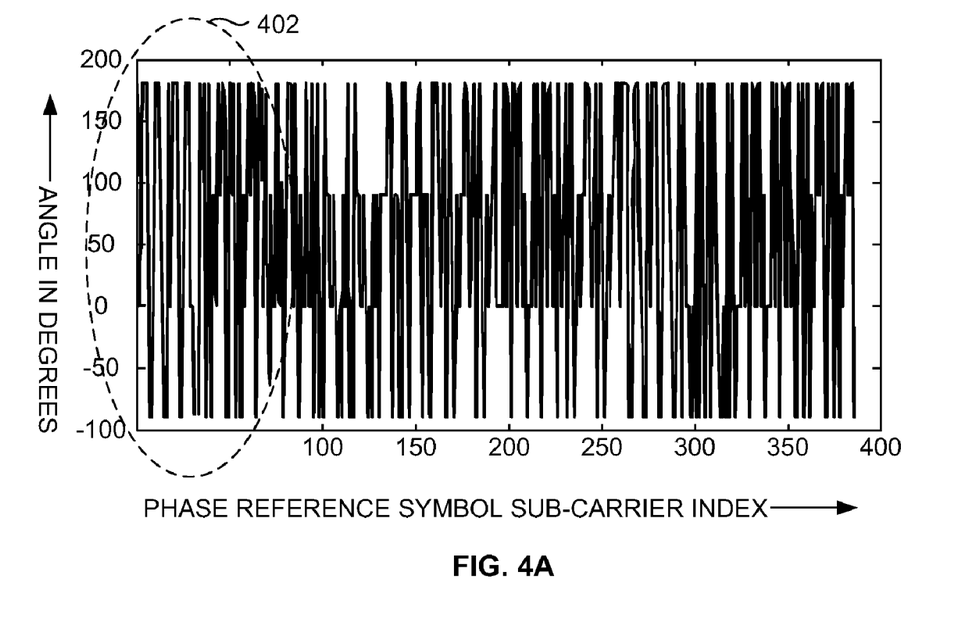
FIGS. 4A and 4B illustrate graphical representations of a phase reference symbol angle according to an embodiment herein.
Figure 4B:
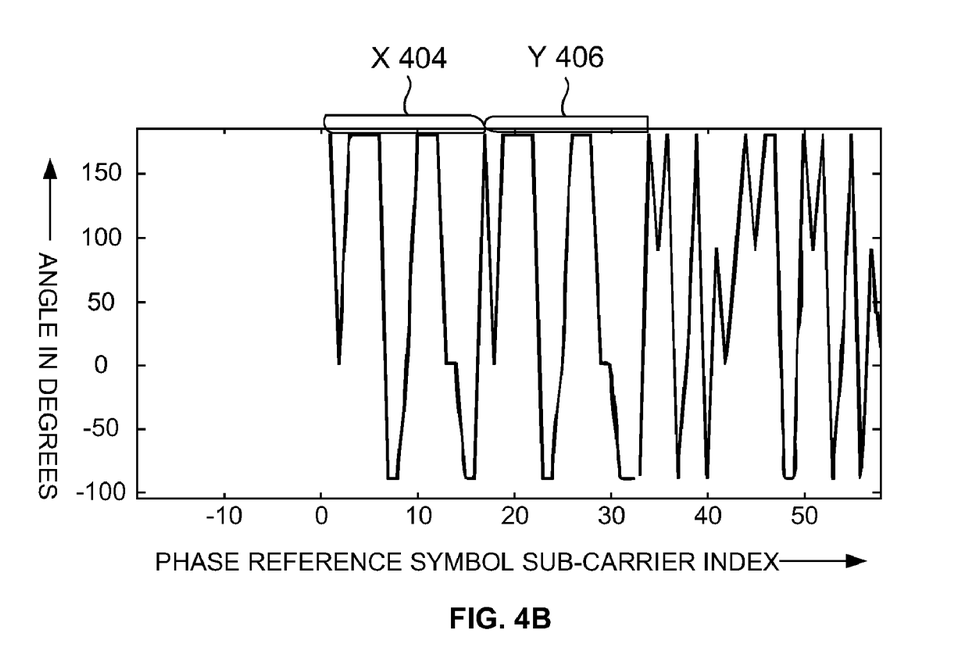

FIGS. 4A and 4B illustrate graphical representations of a phase reference symbol angle according to an embodiment herein. In FIG. 4A, the graphical representation refers to an angle of a phase reference symbol for mode 2. The graphical representation is a plot of angle in degrees along y-axis and phase reference symbol sub-carrier index along x-axis. The difference between the modes (i.e., mode 2 and mode 4) is the periodicity duration of the phase reference symbol angle. Area 402 of FIG. 4A is illustrated in greater detail in FIG. 4B. In FIG. 4B, the phase reference symbol has a periodicity in its values X 404 and Y 406. The graphical representation is a plot of angle in degrees along y-axis and phase reference symbol sub-carrier index along x-axis. For example, each successive 16th value is the same (e.g., the values from 1 to 16 are the same as 17 to 33). Thus, the correlator output has more than one peak, as shown. In FIGS. 4A and 4B, the x-axis is the phase reference symbol sub-carrier index and the Y-axis is the angle (in degrees).

Figure 5:
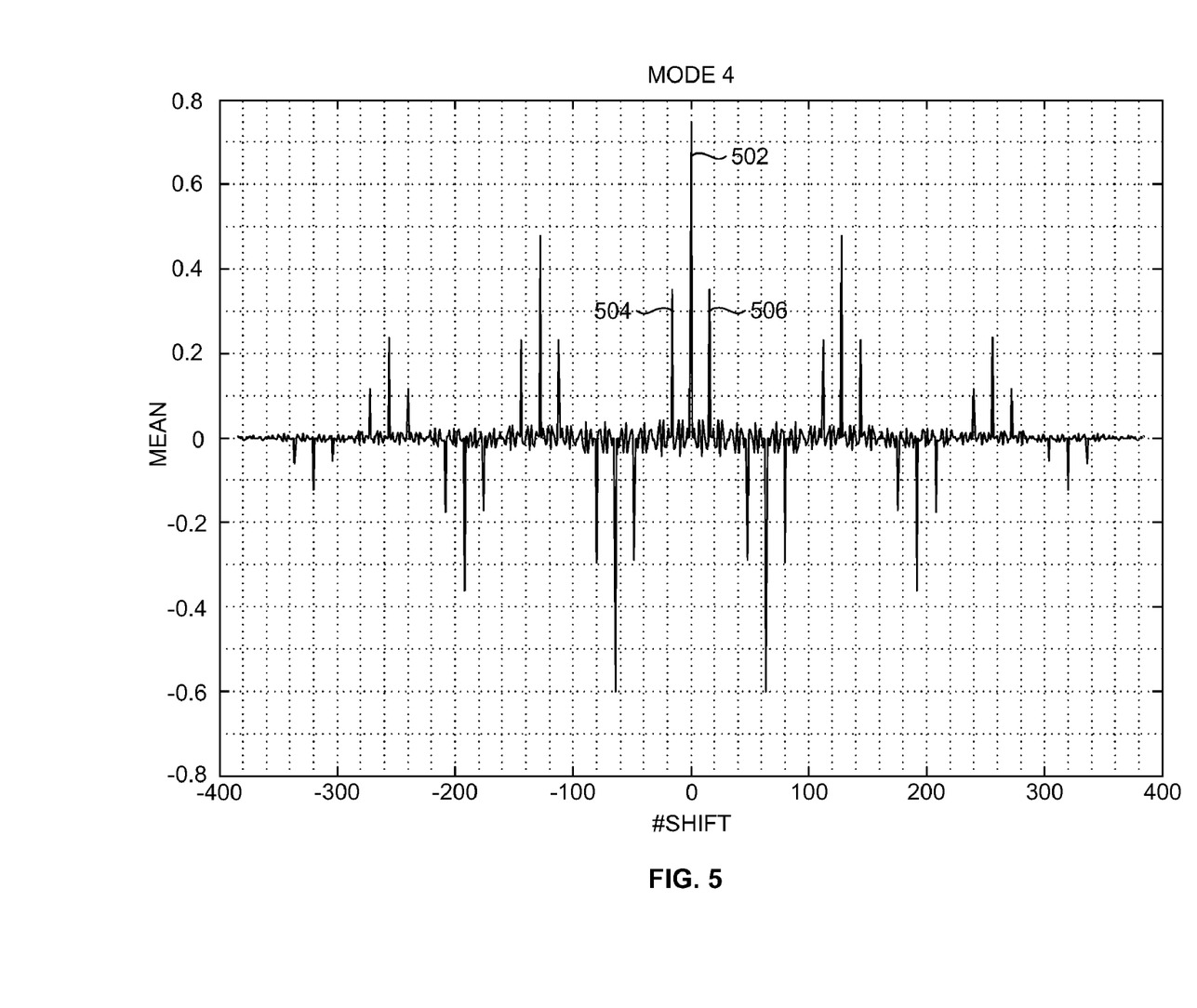
FIG. 5 is a graphical representation of a correlator output for mode 4 according to an embodiment herein.
Figure 6A:
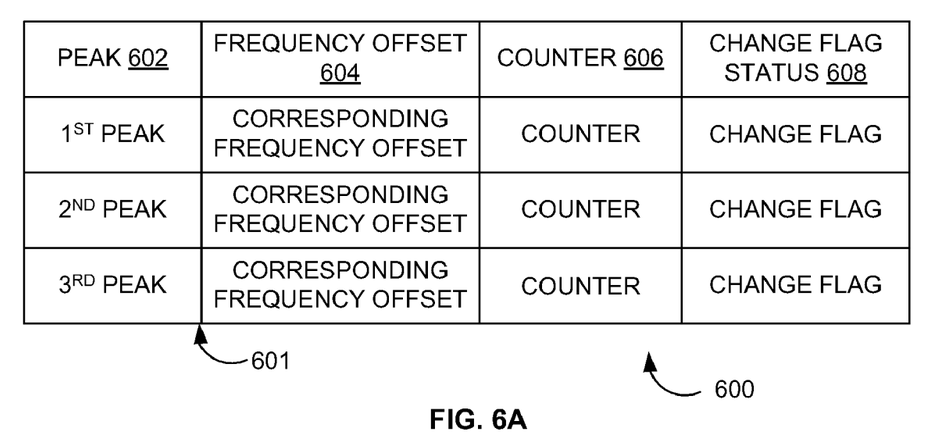
FIG. 6A is a table view of a buffer structure according to an embodiment herein.

FIG. 5 is a graphical representation of a correlator output for mode 4 according to an embodiment herein. The graph is a plot of number of shifts along the x-axis and a mean along the y-axis. The maximum value 502 (e.g., a highest peak) of the shift is limited to 64 and is operated from −64 to +64. In this region, only the main peak with its side peaks 504 and 506 and the secondary peaks are considered. All the negative values are ignored and only the main peak 502 and its side peaks 504, 506 (at −16 to +16) are considered. An average is computed over the frames to decrease the effect of the side peaks 504, 506. The averaged values are usually stored in a memory (e.g., a size of 128 entries). In a preferred embodiment, the first three peaks of the correlator output are stored in a buffer 600 (of FIG. 6).

FIG. 6A is a table view of a buffer structure 600 having a decision buffer 101, a peak field 602, a frequency offset field 604, a counter field 606, and a change flag status field 608 according to an embodiment herein. The peak field 602 contains the first three peaks (e.g., a $1^{st}$ peak, a $2^{nd}$ peak, and a $3^{rd}$ peak) of the correlator output in the buffer 600. The frequency offset field 604 contains the corresponding frequency offset of the peaks. The counter field 606 indicates the records of the corresponding peaks. The change flag field 608 indicates whether the entry has been changed during the frame 100 (of FIG. 1). If an entry is not changed during the frame 100 (of FIG. 1) (e.g., the entry contents not found in the peak) then the peak field is decayed in the buffer 600. If there is no frequency offset in the three peaks for a specified time of duration, then its entry is removed.

Figure 6B:
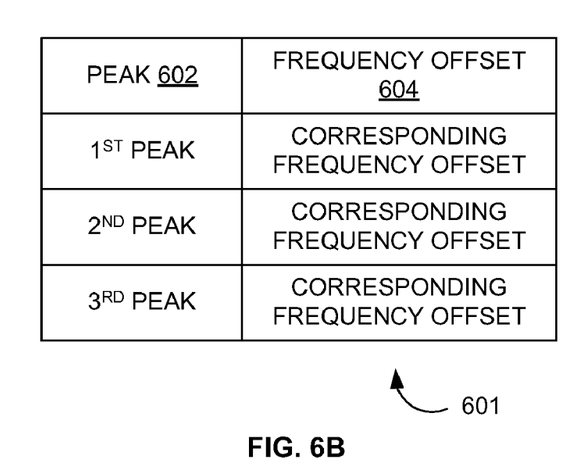
FIG. 6B is a table view of a decision buffer according to an embodiment herein.

FIG. 6B is a table view of the decision buffer 601 of FIG. 6A having a peak field 602, and a frequency offset field 604 according to an embodiment herein. The peak field 602 contains the first three peaks (e.g., a $1^{st}$ peak, a $2^{nd}$ peak, and a $3^{rd}$ peak) of the correlator output in the decision buffer 601. The frequency offset field 604 contains the corresponding frequency offset of the peaks. In one embodiment the entries which have counter field $\geq B$ (parameter) are moved to the decision buffer 601 at each frame, which will have only the peak field 602 and the frequency offset field 604 (e.g., as illustrated in FIG. 6B). At the end, the decision buffer entries will be processed and the entry that has maximum value in the peak field 602, and its corresponding frequency offset value from the frequency offset field 604 will be selected.

Figure 7A:
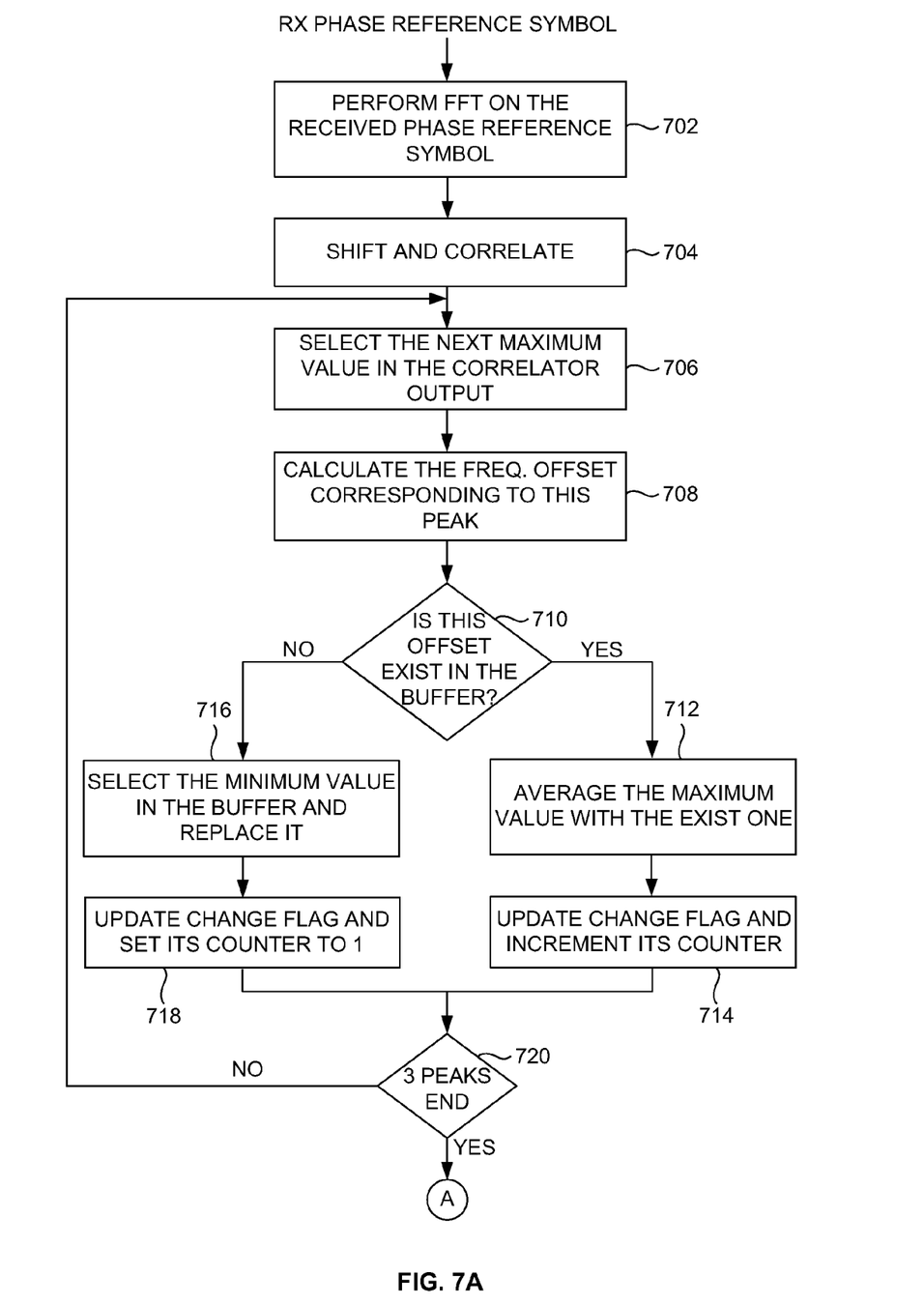
FIGS. 7A and 7B are flow diagrams illustrating a method of estimating a coarse frequency offset of DMB transmission frames according to an embodiment herein.
Figure 7B:
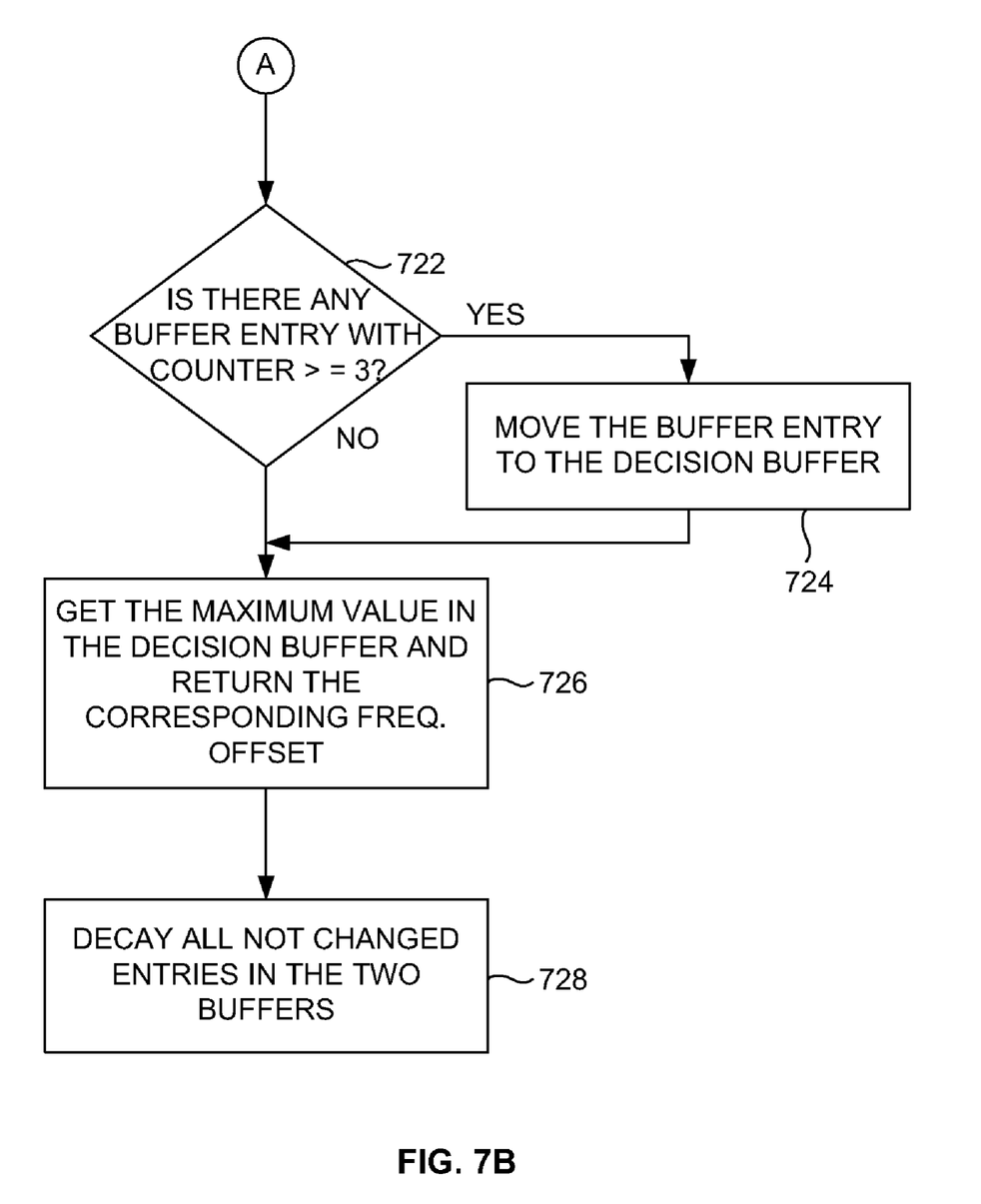

FIGS. 7A and 7B are flow diagrams of a method of estimating a coarse frequency offset of DMB transmission frames 100 (of FIG. 1) according to an embodiment herein. A receiver phase reference symbol is fed as an input. In step 702, an FFT is performed on the received phase reference symbol. In step 704, the received phase reference symbol is shifted to right and left step-by-step, and in each step the shifted phase reference symbol is correlated with the correct phase reference symbol. In step 706, the maximum value in the correlator output is selected. In one embodiment, the output of the correlation gives the maximum value when shifted phase reference symbol is exactly same as the correct phase reference symbol.

In step 708, the frequency offset corresponding to the peak value (e.g., the maximum value selected) is calculated. In step 710, it is checked whether this offset exists in the buffer 600 (of FIG. 6). If the offset exists in the buffer 600 (if yes), then an average value is obtained from the maximum value and the existing one in step 712 and a change flag is updated and a counter 606 (of FIG. 6) is incremented in step 714. In one embodiment, the average value is obtained using the equation X=a*X (in buffer)+(1−a)*X (new), where a represents the leaky integrator alpha.

If the offset does not exist in the buffer 600 (if No), then the maximum value is selected in the buffer 600 and replaced in step 716 and a change flag is updated and a counter is set to 1 in step 718. In step 720, it is checked whether the three peaks terminate. If the three peaks do not terminate (if No) then step 706 is repeated. Else if the three peaks terminate (is yes) then it is checked whether any buffer entry with the counter is greater than or equal to 3 in step 722. If the buffer entry with the counter is greater than or equal to a predefined parameter (e.g., 3) then the entry is stored in a decision buffer in step 724. In one embodiment, the decision buffer is selected and the corresponding frequency offset is returned in step 726. In step 728, all not changed entries are decayed in two buffers.

Figure 8:
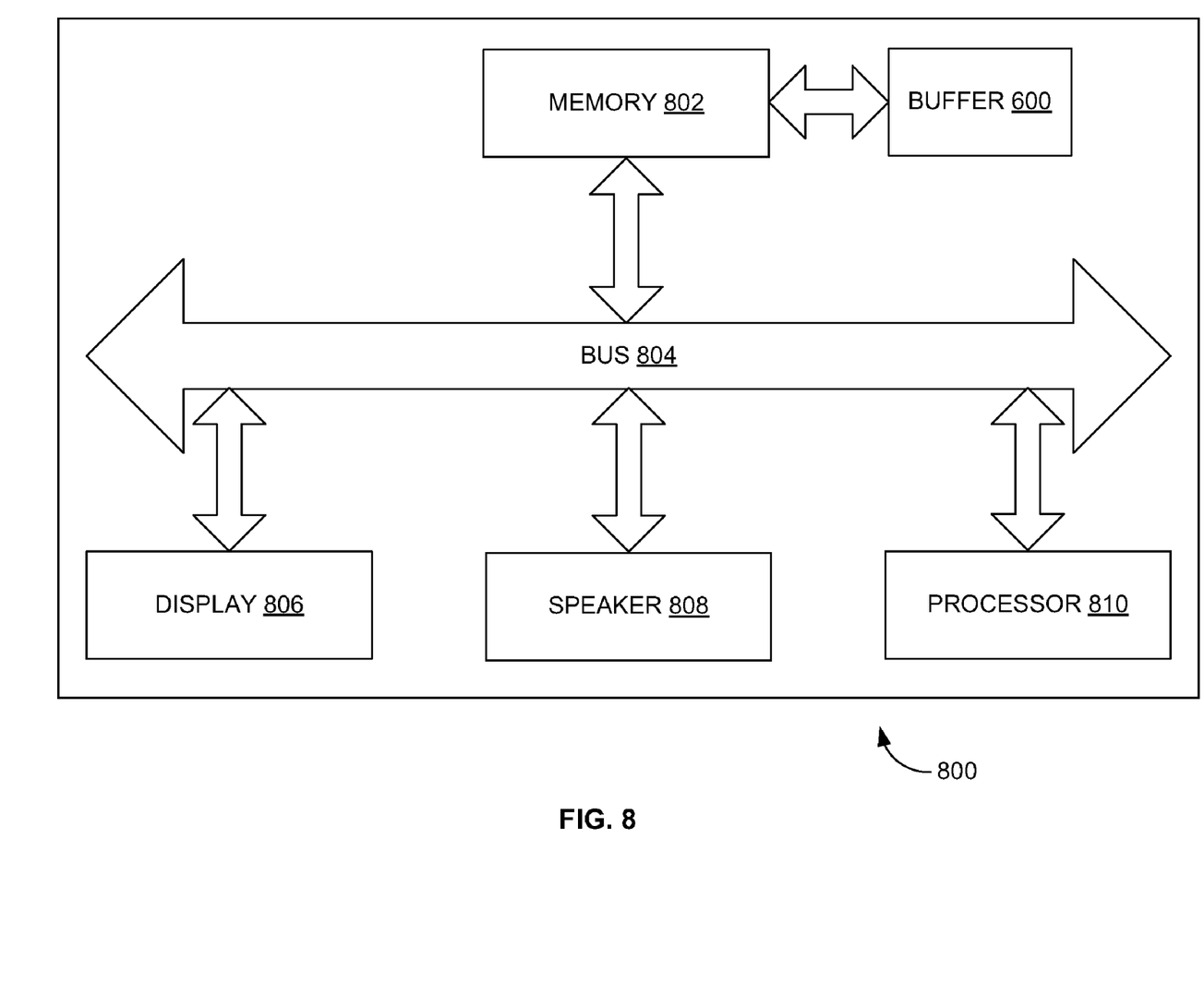
FIG. 8 illustrates a schematic diagram of a receiver according to an embodiment herein.

FIG. 8 illustrates a schematic diagram of a receiver 800 having the buffer 600, a memory 802 having a computer set of instructions, a bus 804, a display 806, a speaker 808, and a processor 810 capable of processing a set of instructions to perform any one or more of the methodologies herein, according to an embodiment herein. The processor 810 may also enable digital content to be consumed in the form of video for output via one or more displays 806 or audio for output via speaker and/or earphones 808. The processor 810 may also carry out the methods described herein and in accordance with the embodiments herein. Digital content may also be stored in the memory 802 for future processing or consumption. The memory 802 may also store program specific information and/or service information (PSI/SI), including information about digital content (e.g., the detected information bits) available in the future or stored from the past.

A user of the receiver 800 may view this stored information on display 806 and select an item of for viewing, listening, or other uses via input, which may take the form of keypad, scroll, or other input device(s) or combinations thereof. When digital content is selected, the processor 810 may pass information. The content and PSI/SI may be passed among functions within the receiver 800 using bus 804.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
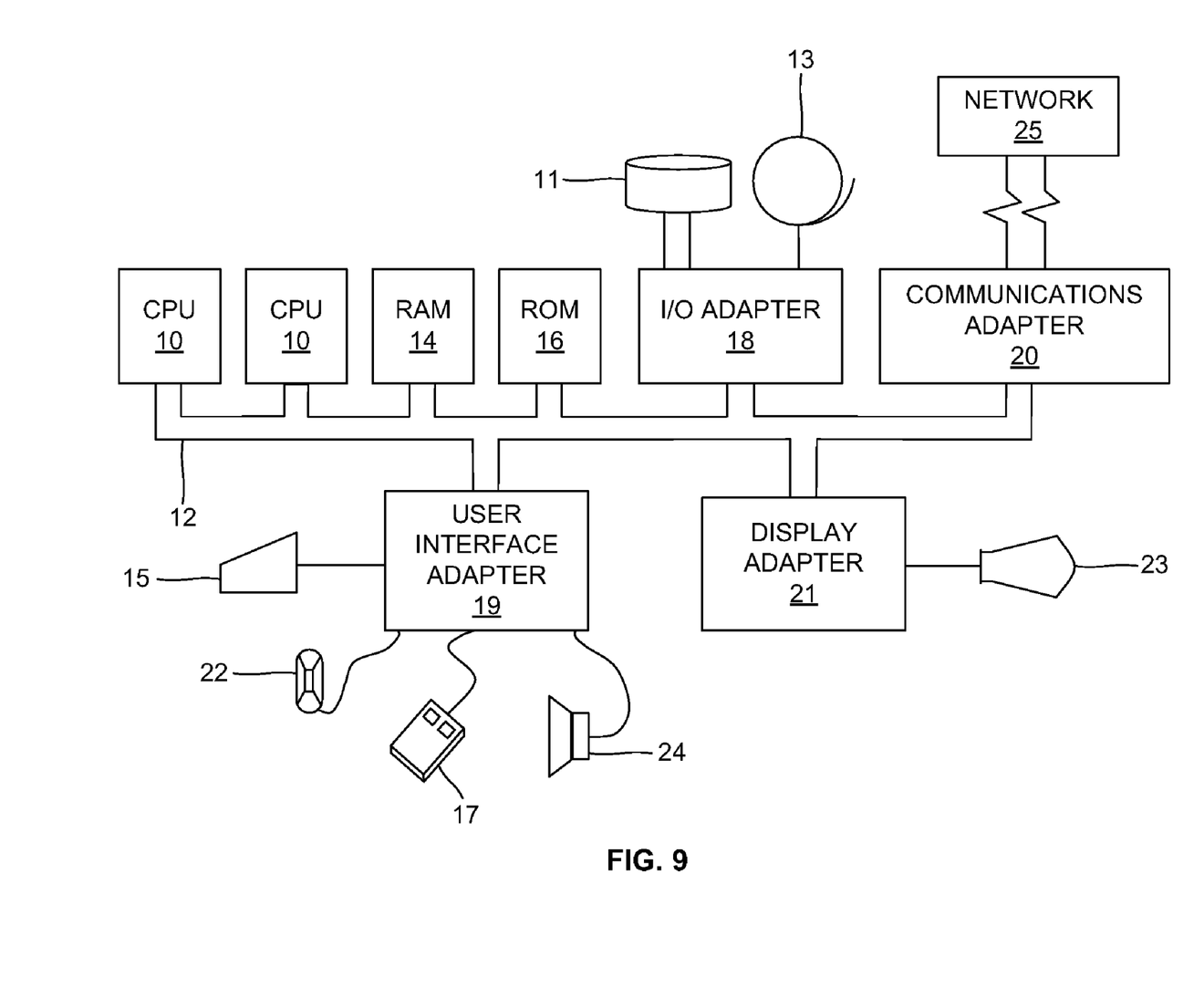
FIG. 9 illustrates a schematic diagram of a computer architecture used in accordance with the embodiments herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 10:
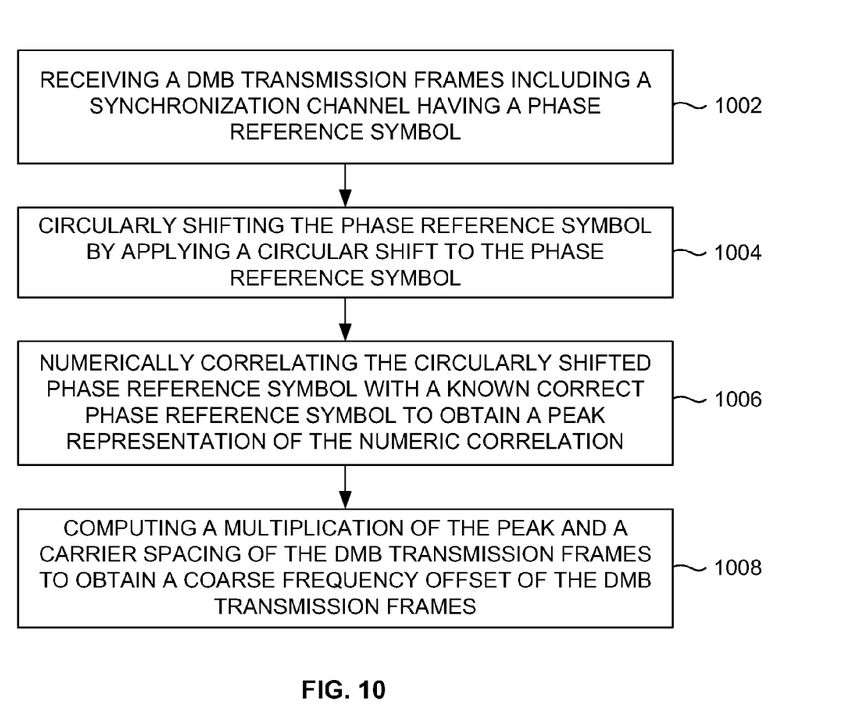
FIG. 10 is a flow diagram illustrating a method of estimating a coarse frequency offset of DMB transmission frames according to an embodiment herein.

FIG. 10, with reference to FIGS. 1 through 9, is a flow diagram illustrating a method of estimating a coarse frequency offset of DMB transmission frames according to an embodiment herein, wherein the method comprises receiving (1002) the DMB transmission frames including a synchronization channel having a phase reference symbol; circularly shifting (1004) the phase reference symbol by applying a circular shift to the phase reference symbol; numerically correlating (1006) the circularly shifted phase reference symbol with a known correct phase reference symbol to obtain a peak representation of the numeric correlation; and computing (1008) a multiplication of the peak and a carrier spacing of the DMB transmission frames to obtain a coarse frequency offset of the DMB transmission frames The method further comprises determining the peak when the circularly shifted phase reference symbol is equal to the known correct phase reference symbol. Additionally, the peak and side peaks corresponding to the peak are operated in a range of a maximum value of the circular shift. Moreover, a negative value of the peak and the side peaks are discarded when performing the correlating process. Furthermore, the peak is stored in a buffer 600.

The embodiments herein provide a technique of estimating a coarse frequency offset of a DMB transmission frames. In addition, this approach removes the presence of fading and noise in the peaks. An average is computed over the DMB transmission frames to reduce the effect of the side peaks.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus for estimating a coarse frequency offset in Digital Multimedia Broadcasting (DMB) transmission frames, said apparatus comprising:
    a receiver that receives a phase reference symbol;
    a memory unit operatively connected to said receiver and comprising a programmable set of instructions;
    a display unit operatively connected to said memory unit;
    a buffer operatively connected to said memory unit, wherein said buffer comprises data fields for a peak of a correlator output, a frequency offset of said DMB frames, a counter, and a change flag; and
    a processor that processes said programmable set of instructions comprising:
        receiving said DMB transmission frames comprising a synchronization channel comprising a phase reference symbol;
        circularly shifting said phase reference symbol by applying a circular shift to said phase reference symbol;
        numerically correlating the circularly shifted phase reference symbol with a known correct phase reference symbol to obtain a highest peak and a side peaks of the numeric correlation;
        computing a phase reference symbol angle based on a multiplication of said peak and a carrier spacing of said DMB transmission frames;
        summing said phase reference symbol angle for all of sub carriers within said phase reference symbol;
        computing an average of said highest peak over said DMB transmission frames to reduce effects of said side peaks if a frequency offset exists in said buffer;
        updating said change flag;
        incrementing said counter; and determining a buffer entry if said buffer entry with said counter is greater than or equal to a predefined parameter.

2. The apparatus of claim 1, wherein said peak is obtained when said shifted phase reference symbol is equal to said correct phase reference symbol.

3. The apparatus of claim 1, wherein a lowest peak is selected and replaced in said buffer if said frequency offset does not exist in said buffer.

4. The apparatus of claim 3, wherein said change flag is periodically updated and said counter is set to 1.

5. The apparatus of claim 1, wherein said buffer entry is stored in a decision buffer if said buffer entry is greater than or equal to said predefined parameter, and wherein said decision buffer comprises said peak and said frequency offset.

6. The apparatus of claim 1, wherein the peak in said decision buffer is selected and a corresponding frequency offset is returned as said coarse frequency offset.

7. The apparatus of claim 6, wherein all unchanged buffer entries are decayed in said buffer and said decision buffer.

8. The apparatus of claim 1, wherein said buffer entry is determined if said peak terminates.

9. A method of estimating a coarse frequency offset of Digital Multimedia Broadcasting (DMB) transmission frames, said method comprising:
receiving a phase reference symbol;
providing a buffer comprising data fields for a peak of a correlator output, a frequency offset of said DMB frames, a counter, and a change flag;
receiving said DMB transmission frames comprising a synchronization channel comprising a phase reference symbol;
circularly shifting said phase reference symbol by applying a circular shift to said phase reference symbol;
numerically correlating the circularly shifted phase reference symbol with a known correct phase reference symbol to obtain a highest peak and side peaks of the numeric correlation;
computing a phase reference symbol angle based on a multiplication of said peak and a carrier spacing of said DMB transmission frames;
summing said phase reference symbol angle for all of sub carriers within said phase reference symbol;
computing an average of said highest peak over said DMB transmission frames to reduce effects of said side peaks if a frequency offset exists in said buffer;
updating said change flag;
incrementing said counter; and
determining a buffer entry if said buffer entry with said counter is greater than or equal to a predefined parameter.

10. The method of claim 9, wherein said peak is obtained when said shifted phase reference symbol is equal to said correct phase reference symbol.

11. The method of claim 9, wherein a lowest peak is selected and replaced in said buffer if said frequency offset does not exist in said buffer.

12. The method of claim 11, wherein said change flag is periodically updated and said counter is set to 1.

13. The method of claim 9, wherein said buffer entry is stored in a decision buffer if said buffer entry is greater than or equal to said predefined parameter, and wherein said decision buffer comprises said peak and said frequency offset.

14. The method of claim 9, wherein the peak in said decision buffer is selected and a corresponding frequency offset is returned as said coarse frequency offset.

15. The method of claim 14, wherein all unchanged buffer entries are decayed in said buffer and said decision buffer.

16. The method of claim 9, wherein said buffer entry is determined if said peak terminates.

17. A system for estimating a coarse frequency offset of Digital Multimedia Broadcasting (DMB) transmission frames, said system comprising:
means for receiving a phase reference symbol;
a buffer comprising data fields for a peak of a correlator output, a frequency offset of said DMB frames, a counter, and a change flag;
means for receiving said DMB transmission frames comprising a synchronization channel comprising a phase reference symbol;
means for circularly shifting said phase reference symbol by applying a circular shift to said phase reference symbol;
means for numerically correlating the circularly shifted phase reference symbol with a known correct phase reference symbol to obtain a highest peak and side peaks of the numeric correlation;
means for computing a phase reference symbol angle based on a multiplication of said peak and a carrier spacing of said DMB transmission frames;
means for summing said phase reference symbol angle for all of sub carriers within said phase reference symbol;
means for computing an average of said highest peak over said DMB transmission frames to reduce effects of said side peaks if a frequency offset exists in said buffer;
means for updating said change flag;
means for incrementing said counter; and
means for determining a buffer entry if said buffer entry with said counter is greater than or equal to a predefined parameter.

18. The system of claim 17, wherein said peak is obtained when said shifted phase reference symbol is equal to said correct phase reference symbol.

19. The system of claim 17, wherein a lowest peak is selected and replaced in said buffer if said frequency offset does not exist in said buffer.

20. The system of claim 17, wherein said buffer entry is determined if said peak terminates.

* * * * *